United States Patent
Phipps et al.

(10) Patent No.: US 7,106,198 B2
(45) Date of Patent: Sep. 12, 2006

(54) CONTROL OF PROGRAMMABLE MODULES

(75) Inventors: William H. Phipps, Fairport, NY (US); Heiko Rommelmann, Penfield, NY (US); Alberto Rodriguez, Webster, NY (US); Scott J. Bell, Webster, NY (US); Ronald P. Boucher, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 142 days.

(21) Appl. No.: 10/849,686

(22) Filed: May 20, 2004

(65) Prior Publication Data

US 2005/0258962 A1    Nov. 24, 2005

(51) Int. Cl.
G03G 15/00 (2006.01)
B41J 29/393 (2006.01)
G08B 13/14 (2006.01)

(52) U.S. Cl. ............... 340/572.1; 347/19; 399/24

(58) Field of Classification Search .. 340/572.1–572.9, 340/10.51, 10.52, 10.1, 10.3, 571, 568.1, 340/568.2, 5.21; 347/19; 399/9–11, 18, 399/24–30, 81, 262; 714/50–57
See application file for complete search history.

(56) References Cited

U.S. PATENT DOCUMENTS

| | | | |
|---|---|---|---|
| 6,008,727 A | 12/1999 | Want et al. | 340/572.1 |
| 6,176,425 B1 | 1/2001 | Harrison et al. | 235/385 |
| 6,262,662 B1 | 7/2001 | Back et al. | 340/572.1 |
| 6,326,946 B1 | 12/2001 | Moran et al. | 345/156 |
| 6,346,884 B1 | 2/2002 | Uozumi et al. | 340/572.1 |
| 6,351,621 B1 | 2/2002 | Richards et al. | 399/111 |
| 6,584,290 B1 | 6/2003 | Kurz et al. | 399/12 |
| 2001/0008390 A1* | 7/2001 | Berquist et al. | 340/10.31 |
| 2004/0100380 A1* | 5/2004 | Lindsay et al. | 340/540 |
| 2004/0135838 A1* | 7/2004 | Owen et al. | 347/19 |
| 2005/0099265 A1* | 5/2005 | Dix et al. | 340/5.72 |
| 2005/0110638 A1* | 5/2005 | Mohr | 340/572.1 |
| 2005/0253687 A1* | 11/2005 | Martinez et al. | 340/10.2 |

OTHER PUBLICATIONS

Copending U.S. Appl. No. XX/XXX,XXX, filed concurrently herewith, entitled "Control of Programmable Modules," by William H. Phipps et al.

Copending U.S. Appl. No. XX/XXX,XXX, filed concurrently herewith, entitled "Diagnosis of Programmable Modules," by Heiko Rommelmann et al.

Copending U.S. Appl. No. XX/XXX,XXX, filed concurrently herewith, entitled "Control of Programmable Modules," by Heiko Rommelmann et al.

Copending U.S. Appl. No. XX/XXX,XXX, filed concurrently herewith, entitled "Control of Programmable Modules," by Heiko Rommelmann et al.

(Continued)

Primary Examiner—Daniel Wu
Assistant Examiner—Jennifer Mehmood
(74) Attorney, Agent, or Firm—David J. Arthur

(57) ABSTRACT

A portable programming device for electronically programming an electronic tag associated with a module includes a hand-held data receiver containing a communication element adapted to receive data from an electronic tag associated with a module and a data processor having programmed processing instructions. The data processor analyzes data received at the communication element in accordance with programmed processing instructions to produce a processor result based on the received data. The portable programming device also includes a hand-held tag writer comprising a communication element for writing tag content information to a tag memory segment of the electronic tag in response to the processor result.

6 Claims, 14 Drawing Sheets

OTHER PUBLICATIONS

*The Write Stuff: Understanding the Value of Read/Write RFID Functionality*, Technologies Corporation, 2003, pp. 1-4.

*Applications*, Intermec—Authentication, Applications for Flying Null Technology, www.flying-null.com, May 20, 2003.

*Flying Null*, A Unique Product Identity, Flying Null Technology—the new concept in remote magnetic sensing, www.flying-null.com, May 20, 2003.

Copending U.S. Appl. No. 10/458,848, filed Jun. 11, 2003, entitled "Printer Module With On-Board Intelligence," by Heiko Rommelmann et al.

* cited by examiner

US 7,106,198 B2

CONTROL OF PROGRAMMABLE MODULES

CROSS-REFERENCE TO RELATED APPLICATIONS

Reference is made to commonly-assigned copending U.S. patent application Ser. No. 10/850,190, filed concurrently herewith, now U.S. Publication No. 2005/0258963, entitled "Diagnosis of Programmable Modules," by Heiko Rommelmann et al., copending U.S. patent application Ser. No. 10/849,976, filed concurrently herewith, now U.S. Publication No. 2005/0258932, entitled "Control of Programmable Modules," by Heiko Rommelmann et al., copending U.S. patent application Ser. No. 10/849,973, filed concurrently herewith, now U.S. Publication No. 2005/0258931, entitled "Control of Packaged Modules," by Heiko Rommelmann et al., copending U.S. patent application Ser. No. 10/849,974, filed concurrently herewith, now U.S. Publication No. 2005/0258228, entitled "Control of Programmable Modules," by Heiko Rommelmann et al., the disclosures of which are incorporated herein.

BACKGROUND AND SUMMARY

The present invention relates to control of programmable devices or modules. In one aspect, the present invention is particularly useful in inventory and configuration control of modules that are physically identical but can be programmed with alternative configurations.

Various systems allow a user to track items such as manufactured devices or packages. For example, a barcode containing a model number or a serial number or other identifying indicia can be printed on a device or a package. An optical scanner connected to a tracking system can scan the barcode, so that the tracking system can determine the identity and location of the marked item. Such barcode systems rely on "line of sight" access from the barcode reader to the barcode on the item being tracked. In addition, while the tracking system can record various information pertaining to the location and status of the tracked item, the tracked item itself does not retain any information as to where it has been, or what processing steps have been performed on it.

More recently, radio frequency identification (RFID) devices include radio frequency transmitters that have been applied to products for tracking purposes. Such RFID devices contain information that they can transmit to a reader. The radio frequency transmitters do not require "line of sight" access from the reader.

Magnetic tags and sensors have also been demonstrated to track and verify the identity of products. Magnetic tags require close proximity between the information bearing tag and the sensor.

In various instances, holders or transporters of products may wish to alter certain information pertaining to a particular product after the product has been manufactured and entered the distribution channel. For example, a person may wish to know when a product passed through a particular stage in the distribution channel. Such information is important to maintain the freshness of time-sensitive inventory. Also, for certain types of products, such information can be used to detect if the product may have been inappropriately detoured along the distribution channel, which detours could indicate tampering or other mishandling of the product.

In accordance with an aspect of the invention, a portable programming device for electronically programming an electronic tag associated with a module includes a hand-held data receiver containing a communication element adapted to receive data from an electronic tag associated with a module and a data processor. The data processor is adapted to analyze data received at the communication element in accordance with programmed processing instructions and to produce a processor result. The processor result is based on the received data. The portable programming device also includes a hand-held tag writer comprising a communication element for writing tag content information to a tag memory segment of the electronic tag in response to the processor result. In a particular implementation, the data processor includes a memory for storing programmed processing instructions for the data processor.

In accordance with another aspect of the invention, a method of processing an electronic tag associated with a module includes bringing a portable electronic reader device into proximity with an electronic tag associated with a module, causing the portable electronic reader device to read tag data from the electronic tag, electronically processing the tag data in the portable electronic reader device in accordance with programmed instructions stored in the portable electronic reader device to produce a processor result, and transmitting the processor result outside the portable electronic reader device. The processor result is based on the tag data read by the portable electronic reader device.

DETAILED DESCRIPTION

Programmable tags are attached to, or otherwise associated with, various types of products, such as replaceable modules for printing apparatus or other machinery. Such programmable tags include a tag memory in which information can be stored.

Figure 1:
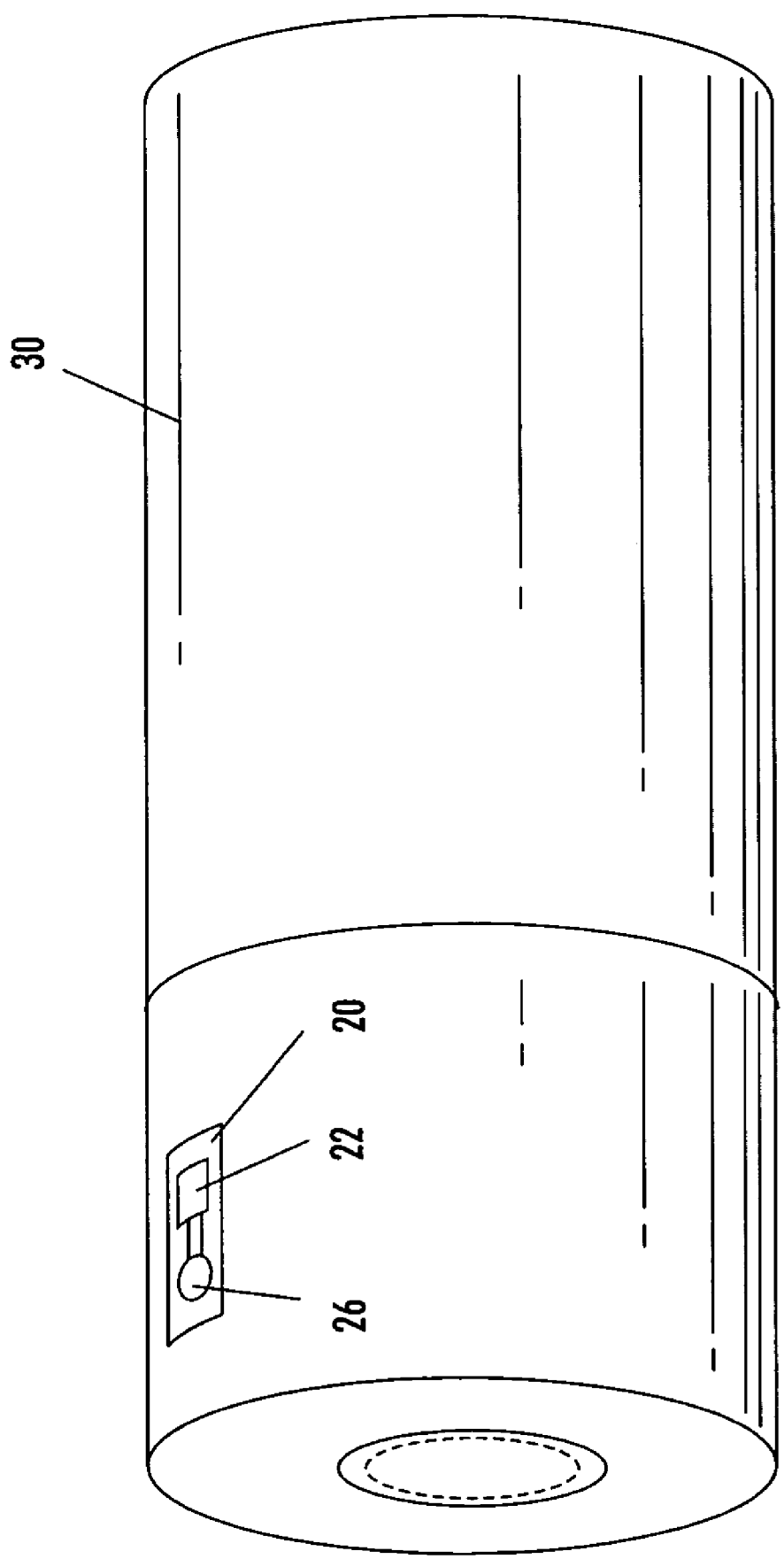
FIG. 1 shows an exemplary application of a programmable module tag to a module.

Referring to FIG. 1, a programmable electronic module tag 20 is associated with a module, such as a replacement part or consumable element for machinery or systems. Particular implementations will be described in the context of a consumable module for a printing apparatus, in particular a toner cartridge 30 containing consumable toner. The cartridge 30 is intended for insertion into a xerographic printing apparatus, in which toner is dispensed from the cartridge for use in the printing process. Although this one particular application is described, the person of skill in the art, having reviewed the subject disclosure, will recognize that the principles thereof can be applied to a wide variety of systems and uses. The term "module" is used to mean any device to which an electronic tag might be attached, or with which a tag might be associated.

Figure 5:
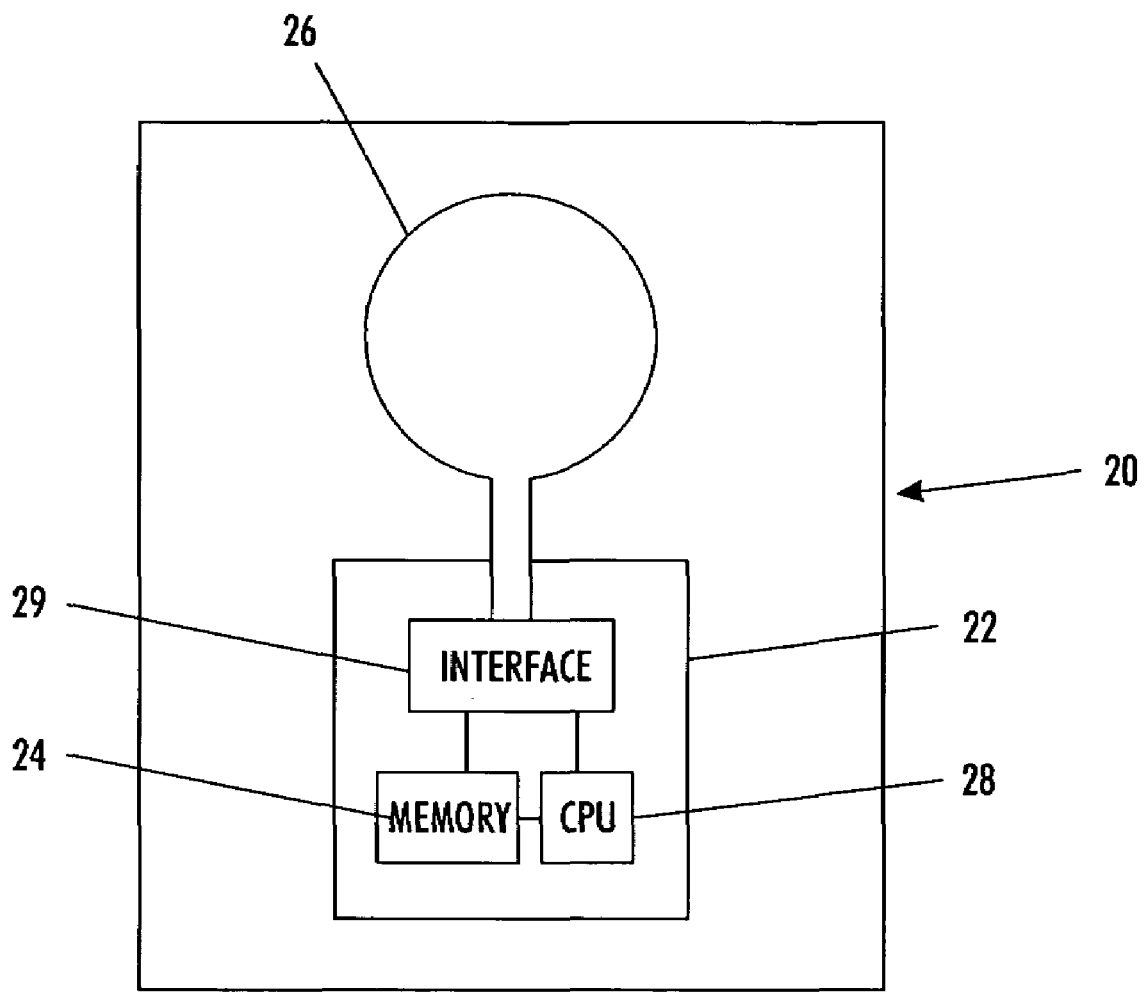
FIG. 5 shows an exemplary implementation of a programmable module tag.

An exemplary electronic module tag 20 is shown in FIG. 5. The electronic tag includes tag electronics 22 that include tag memory 24 for storing information, and a tag communication element 26 for communicating information to and from the electronic module tag. A processor (CPU) 28 provides computational and other capabilities. Interface electronics 29 connect the CPU 28, memory 24, and communication element 26. Many configurations are available for arranging and connecting elements of the electronic module tag.

In a particular implementation, the communication element 26 is a wireless communication element for establishing a wireless communication link with another device. In a particular implementation, the wireless communication element is a radio frequency (RF) antenna for establishing a radio frequency communication link with another device.

The wireless communication element can be an active element, powered by a power source, such as a battery (not shown) embedded on the tag. Alternatively, the wireless communication element can be passive. Such a passive element is energized by the RF signal it receives from another device, such as an RF reader that queries the tag, or an RF writer that delivers information to the tag. Energy from the reader or writer is sufficient to briefly power the RF antenna and interface electronics to enable the RF antenna to receive and transmit information.

Information is stored in the tag memory contained within the tag electronics. Particular information can be stored at particular locations in the tag memory. One path for receiving information to store in the tag memory is through the RF antenna. Information can also be read from the memory. When the communication element is activated, the RF antenna can transmit selected information from the tag memory.

In addition to, or in lieu of, the wireless communication element 26, a wired communication element (not shown) may connect the tag memory 24 through a plug or other connector to an external communication system for delivering information to, and drawing information from, the tag memory.

Figure 2:
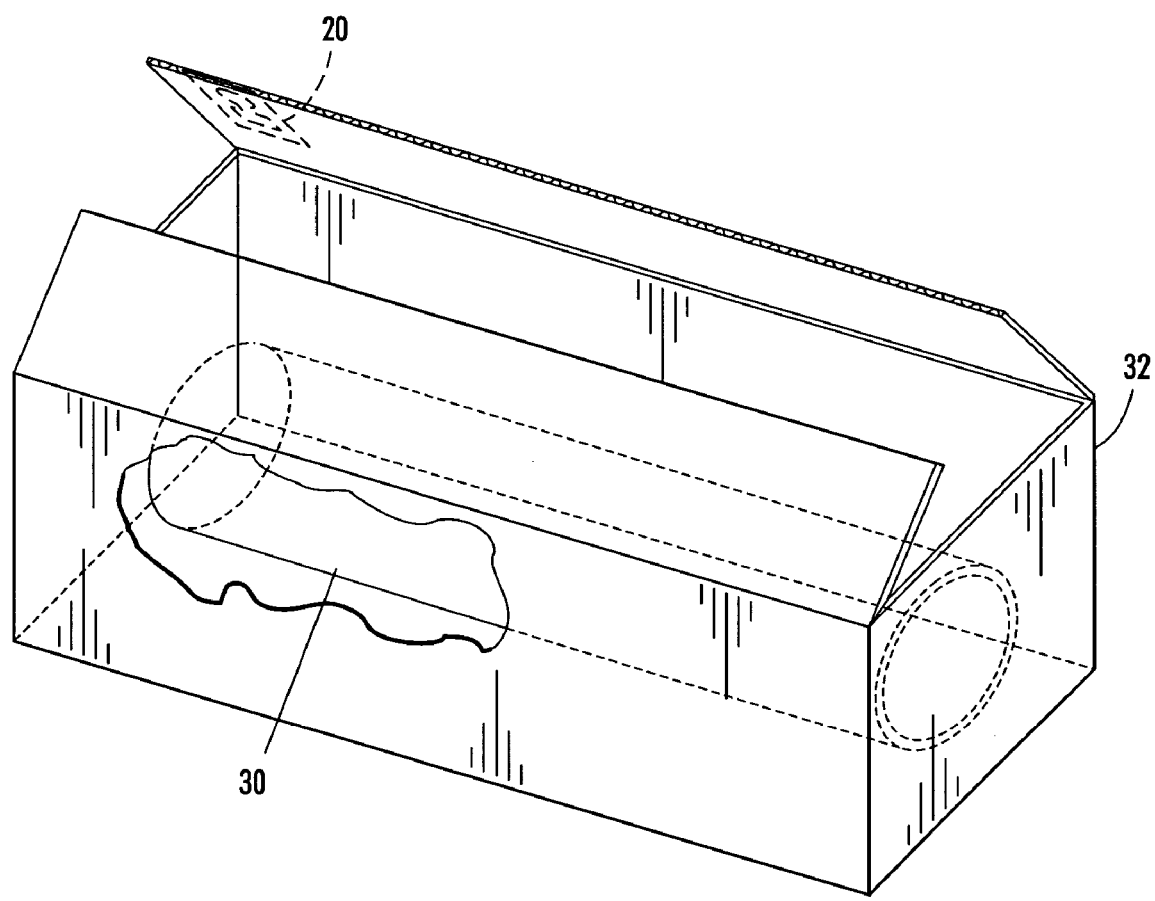
FIG. 2 shows an exemplary application of a programmable module tag to a container for a module.
Figure 3:
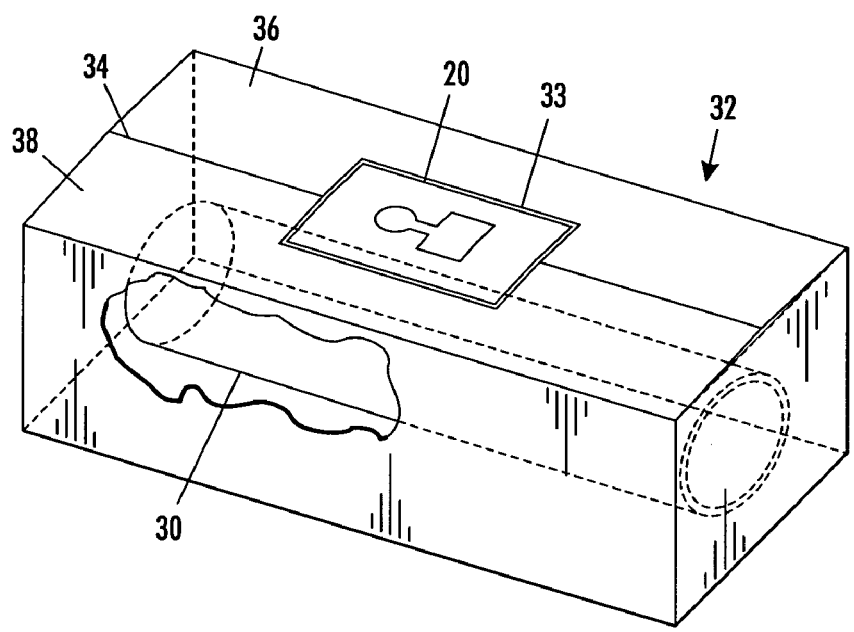
FIG. 3 shows another application of a programmable module tag to a container for a module.
Figure 4:
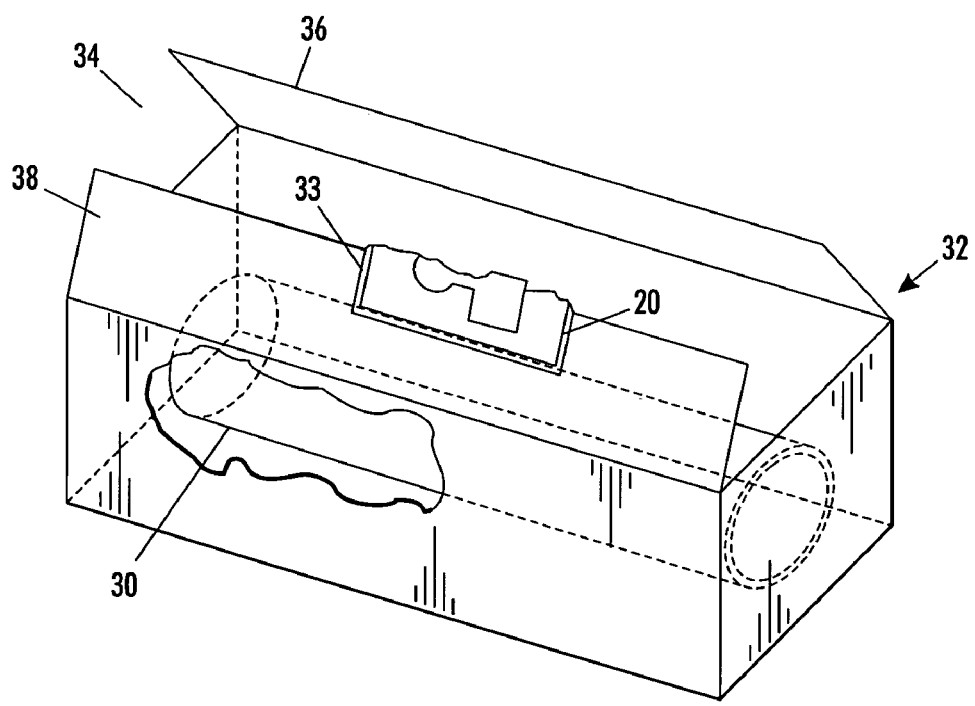
FIG. 4 shows the programmable module tag applied as shown in FIG. 3, after the container has been opened.

The electronic module tag 20 can be attached directly to the toner cartridge module 30, as shown in FIG. 1. In addition, or in alternatives, the module 30 is enclosed within a container 32 for storage and transport, as shown in FIGS. 2–4. As seen in the embodiments of FIG. 2, the tag 20 is embedded in the material forming the container (such as corrugated cardboard). Although a rectilinear container is shown, other shapes can be used for the container. In addition to the replaceable module for the printing apparatus, the container may also enclose packing material (not shown) to protect the enclosed module. In some instances, the container may enclose multiple modules, which may be identical to one another, or may form a set of related modules. The module, such as the toner cartridge 30, is associated with an electronic module tag 20 on the container 32 by placing the module in the container having the programmable electronic tag 20. The module enclosed within the container may or may not have a separate electronic tag 20 affixed directly to the module (FIG. 1).

In an example shown in FIGS. 3 and 4, the electronic tag 20 is attached with a label 33 to the container 32. One portion of the container (shown in FIG. 3 as the top) has an opening separation 34 that is adapted to expand upon opening the container. In the particular implementation illustrated, the opening separation is formed in the top surface by forming the top surface as two sections 36, 38 of container material that meet at a seam that forms the opening separation 34. The container with the opening separation expanded to open the container is shown in FIG. 4. Other types of opening separations are also known. For example, the container may be formed of a container body with an open side and a separate piece of material to form a lid, having an opening separation that extends around the perimeter of the lid, where the edge of the lid meets the container body. Other types of opening separations might include a pull tab that tears the container material, or that has a line of perforations to permit the pull tab to separate to sections of the container. The label bearing the electronic tag is securely attached to the container, preferably spanning the opening separation.

Information can be stored in the tag memory of the module tag 20 after the module tag has been attached to a particular module, attached to the container enclosing a particular module, or in some other manner associated with a particular module. Thus, information can be added to the tag memory at different times and when the module is at different locations.

A portable tag processing device 50 including a tag programmer 40 (FIG. 6) is adapted to program the module tag 20 after the module tag has been associated with a particular module. The tag programmer is adapted to cause information to be stored in the tag memory of a tag associated with a particular module.

Figure 8:
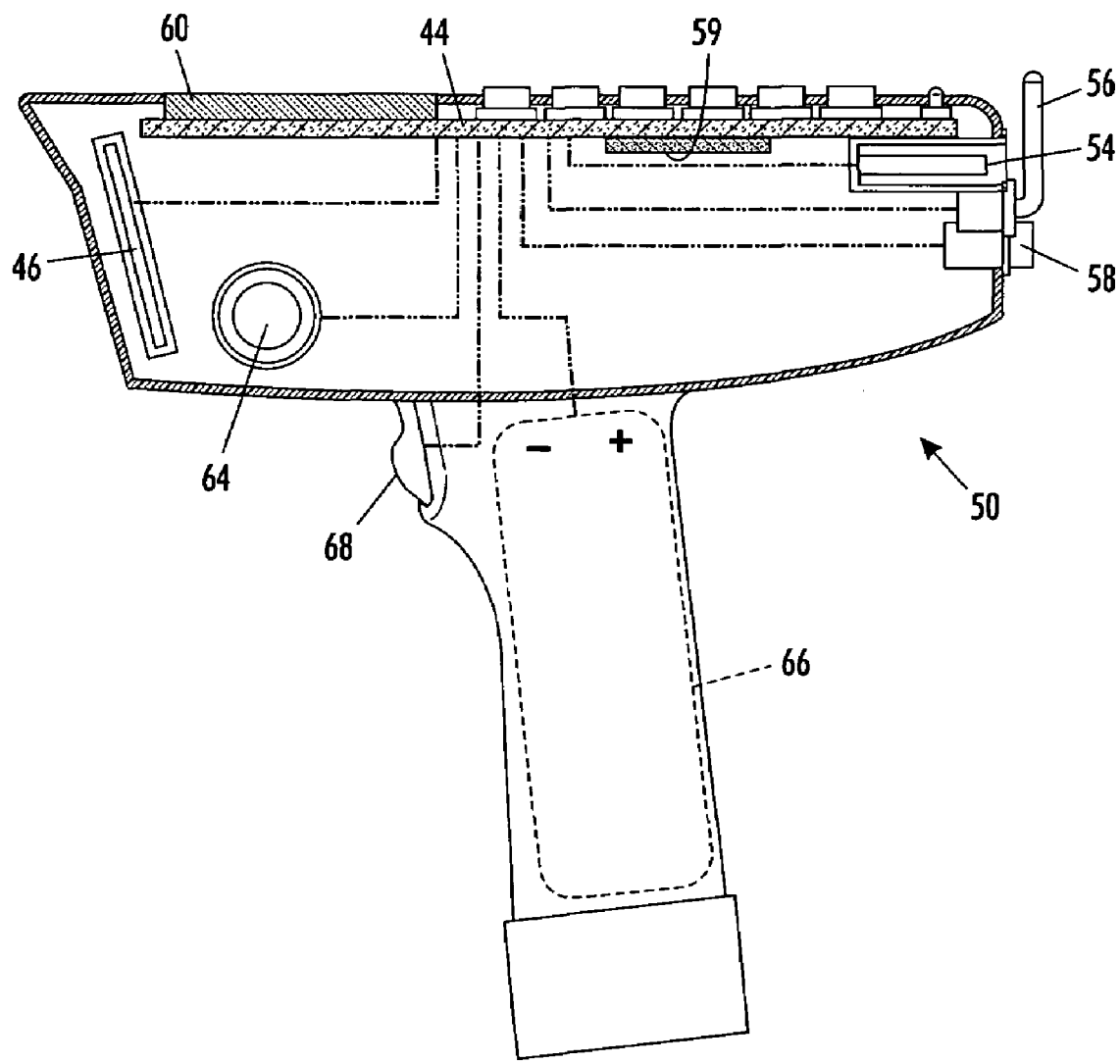
FIG. 8 is a cross-sectional view of the portable module tag programmer of FIG. 7, taken along line 8—8 of FIG. 7.
Figure 9:
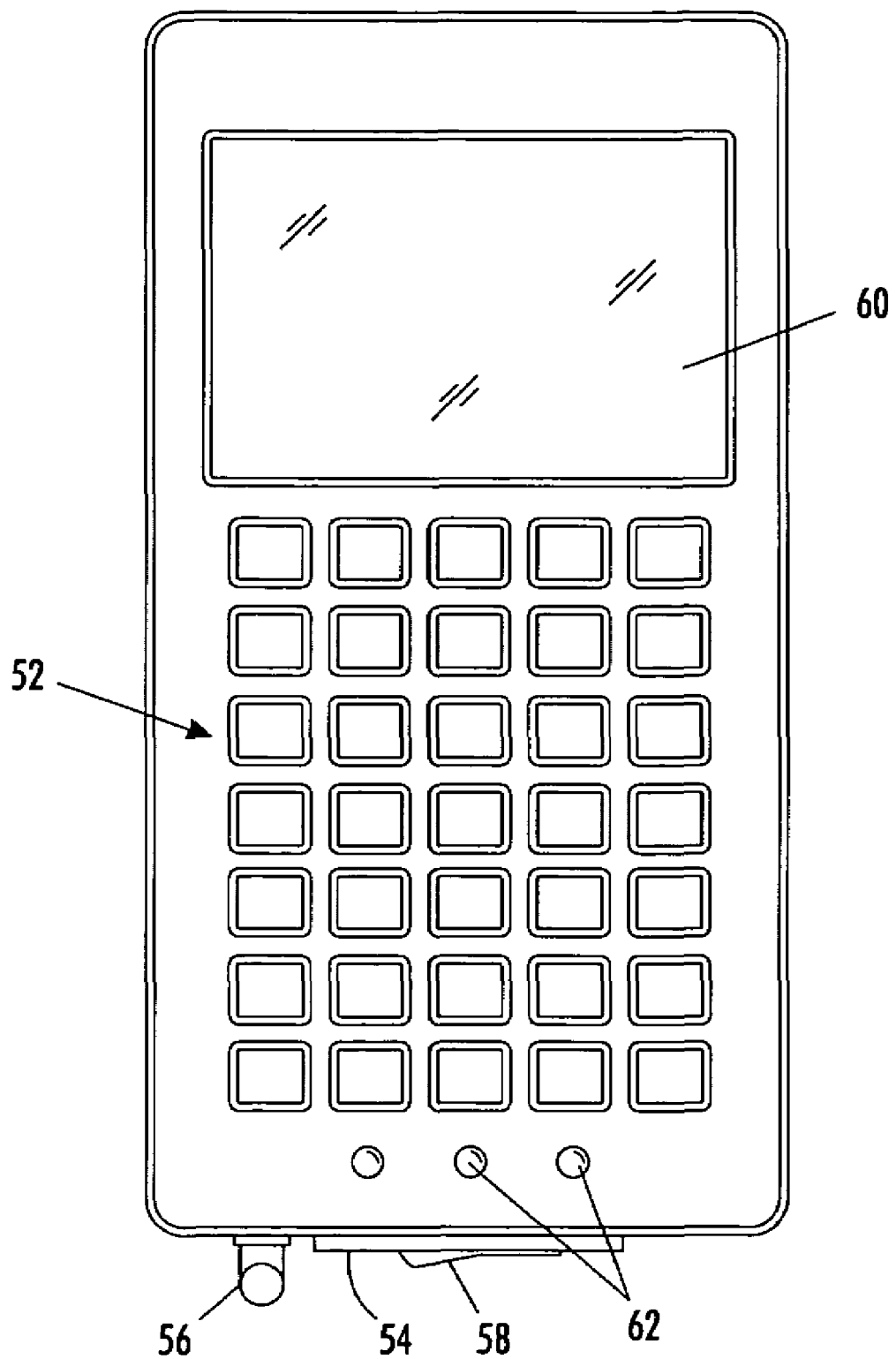
FIG. 9 is a top view of the portable module tag programmer of FIG. 7.
Figure 10:
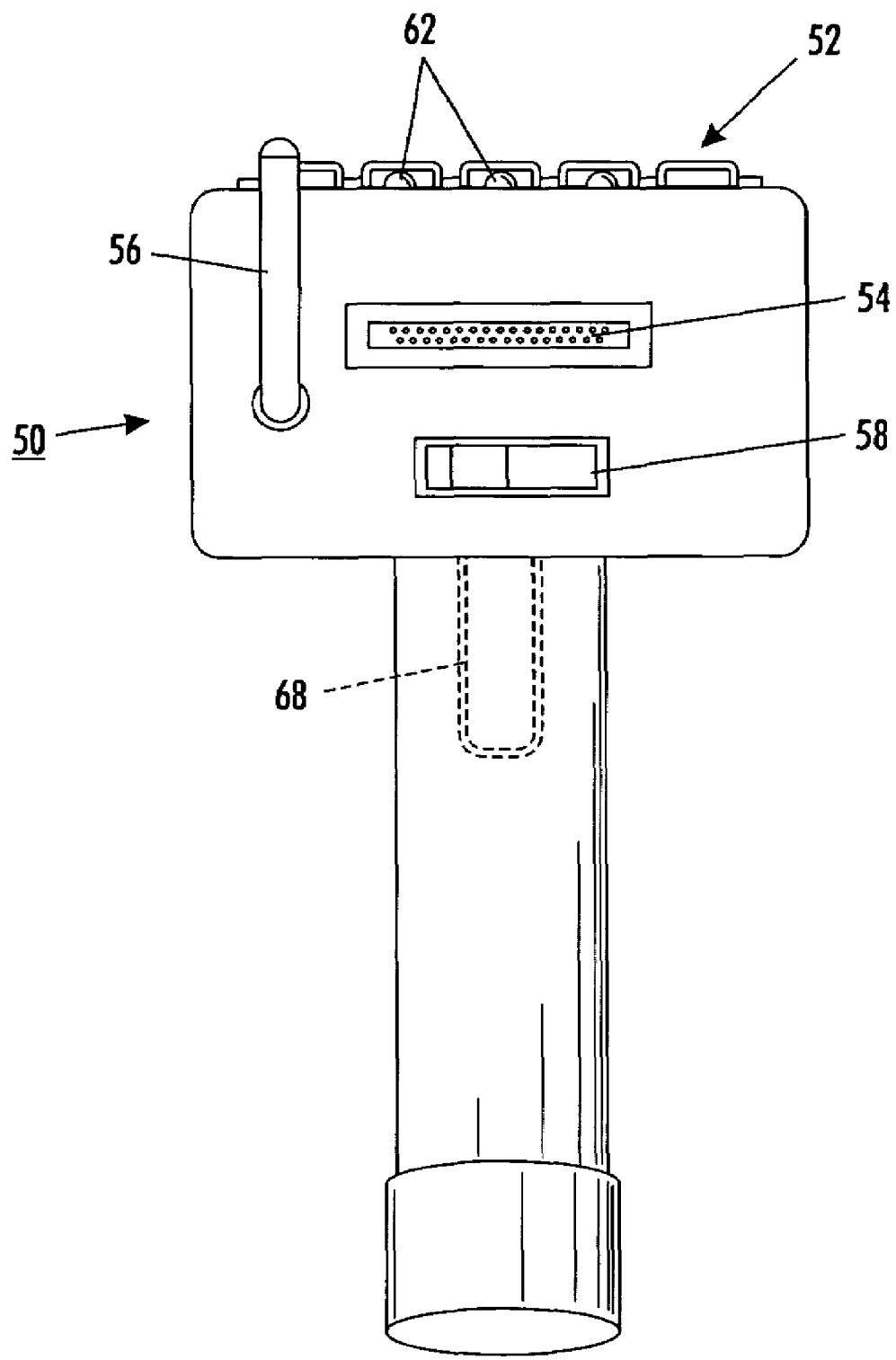
FIG. 10 is a rear end view of the portable module tag programmer of FIG. 7.

The tag programmer 40 includes a tag reader that can electronically read information from the electronic module tag, and a tag writer that can program information into the electronic module tag. Most, if not all, components may be shared between the tag reader and the tag writer. The tag programmer 40 includes tag programmer electronics 44 (FIG. 8), and a tag programmer communication element 46. The tag programmer communication element 46 communicates with the tag communication element 26 of the electronic tag to form a communication link between the tag programmer and the electronic module tag.

In an example, the tag programmer communication element 46 is a wireless communication element, such as an RF antenna. The RF antenna of the tag programmer emits sufficient energy to energize the RF antenna of the wireless communication element 26 of the tag when the tag programmer communication element 46 and the tag communication element 26 are within a predetermined operating range of one another. Thus, the tag programmer establishes a communication link between the tag programmer and the electronic tag.

Once a communication link is established between the tag programmer and the electronic tag, the tag programmer and the electronic tag can exchange information across that communication link. Although a radio frequency wireless communication link is shown, other types of communication links can also be used. For example, wires connected with plugs or sockets (not shown) can provide wired communication links between the tag reader and the electronic tag. An external communication link (not shown) may allow data to pass to and/or from the tag programmer to another system, such as a computer or other information management system.

The tag processing device 50 incorporating the tag programmer 40 includes user interface components. Such user interface components include a user input element so a user can provide information to the tag programmer, and a user notification element so the tag programmer can convey information to the user.

An exemplary portable tag processing device is shown in FIGS. 7–10. The user input element includes a keypad 52 connected to the programmer electronics 44. The keypad provides a means for a user to supply input information, such as programming instructions, to the processor electronics 44 of the tag programmer. In another implementation, a microphone and voice recognition capabilities can be used as a user input element. Such a microphone and voice recognition capability can reside on a computer, and be connected through a wired communications port 54 to provide user input signals from the computer to the tag programmer. A connecting device, such as a cable, is selectively attached to the wired communications port. The programmer electronics of the tag processing device may include device memory for storing information during operation. Internal storage allows the tag processing device to download (or upload) data and information at intervals. This capability to store information allows tag processing device to be operated for a time without being in continuous communication with an external system through the communications port.

Figure 11:
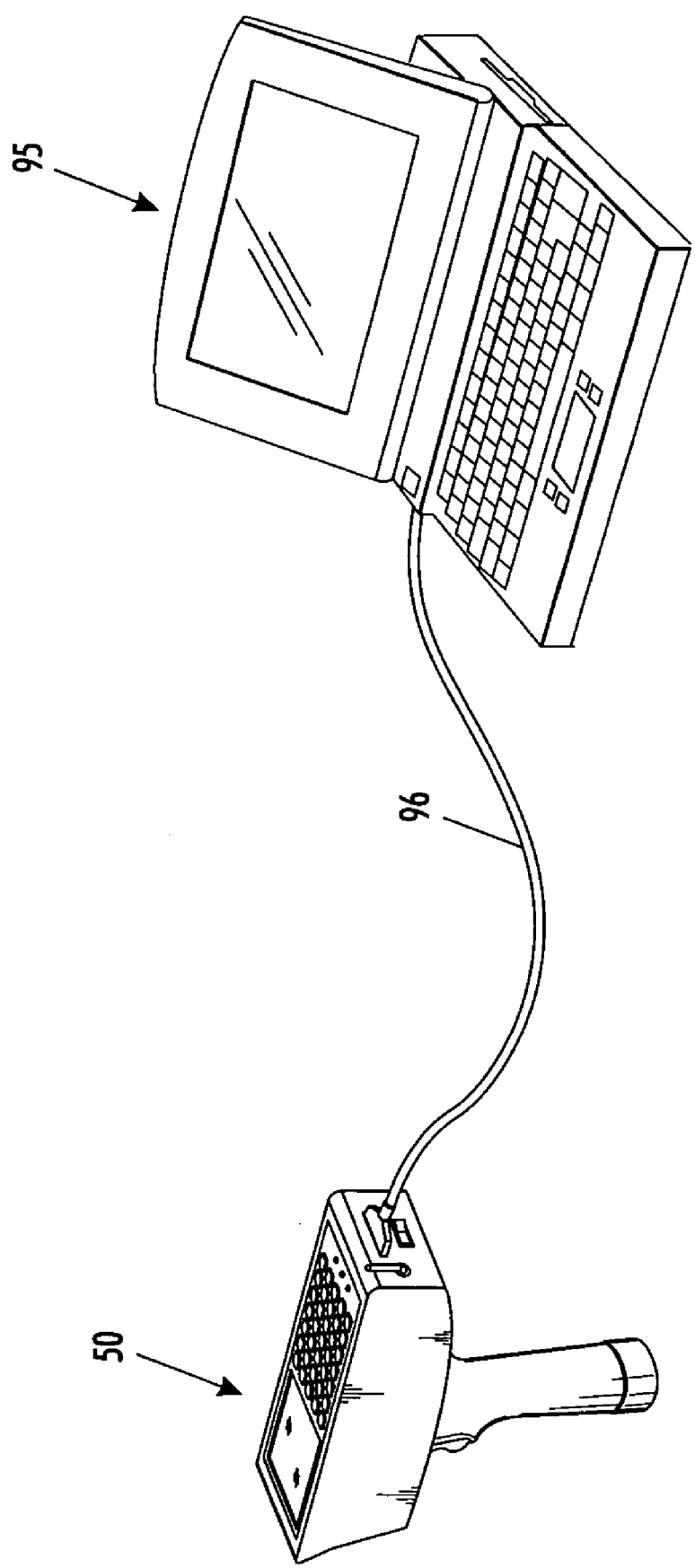
FIG. 11 is a perspective view of a tag processing system incorporating an aspect of the present invention.

In other implementations, the user can supply input information through a computer, using the computer's keyboard or mouse. An exemplary arrangement is shown in FIG. 11 including a portable computer 95 connected to the tag processing device 50 through a cable process 96. One end of the cable is attached to the tag processing device through the wired communications port 54. The other end of the cable attaches to the portable computer through one of the several ports typically available on a computer, such as a parallel (printer) port, a serial port, or a USB (universal serial bus) port. The information input to the computer can be translated as user input signals from the computer to the tag programmer through the communications port 54. Communication to the portable tag programmer can also be conducted wirelessly, such as with infrared or radio frequency signals. An external antenna 56 provides an exemplary connection point for receiving user input information from another element or system over a wireless communication link. An antenna switch 58 provides the ability to connect or disconnect the external antenna, or to transfer communication capability between the external antenna and the communications port 54. Persons familiar with the art will identify other mechanisms for supplying information from a user to the tag processing device 50 for use by the tag programmer.

The tag programmer electronics 44 include a data processor 59. The data processor processes data received at the programmer communication element 46, and also information received from the user input element 52. The data processor manipulates the data according to predetermined criteria. For example, the data processor can be adapted to interpret instructions received from the user input element, to verify information that is received from a module tag over the programmer communication element 46, or to perform calculations upon data received from the module tag. The tag programmer processor is also adapted to cause certain information to be communicated to the module tag, such as by transmitting the information over the programmer communication element 46.

The user interface of the tag processing device also includes user notification elements for communicating information to the user. The user notification elements may include a graphical user interface 60, signal lights 62, and/or an audio output 64. The graphical user interface is adapted to display graphical or text messages, and may be a liquid crystal display (LCD) screen. The programmer electronics controls the messages displayed on the graphical user interface. The graphical user interface can also display information confirming the data entered by the user on the keypad 52.

Signal lights 62 can provide simple visual signals to the user. For example, two signal lights may be included, with one red to indicate a negative condition or result, and the other green to indicate a positive condition or result. A third signal light may indicate a separate function, such as a power-on condition, or may provide a tri-level condition indicator. Other embodiments may have other numbers of signal lights. The signal lights may be light emitting diodes (LED's) or other light emitting devices.

An audio output, such as a speaker 64, is adapted to provide additional user notification by emitting one or more audible signals. Different types of audible signals may signal different conditions. For example, a 'buzzer' tone may indicate a negative condition or result, while a 'beep' tone may indicate a positive condition or result. Audible signals can be used to draw attention to certain conditions. In certain instances, simple signaling devices such as the signal lights and the audio signal output may be able to provide sufficient information to the user, eliminating the need for the graphical user interface.

For extended portability, the portable tag processing device 50 is powered by a self-contained battery 66. A switch 68 allows the user to selectively turn the tag processing device on and off. In other examples, the portable tag processing device is tethered to a power source with a power cord (not shown).

In certain applications, it may be useful to limit the amount of the tag programmer and other elements of the tag processing device that are positioned at the point of use at which the tag programmer to be proximate the module or module-enclosing container having the programmable module tag. For example, only the tag programmer antenna 46 and some immediate support electronics may be at the point of use. Other portions of the processor electronics and the user interface elements can be positioned remote from the point of use, connected to the tag programmer antenna by additional communication elements (not shown).

Figure 6:
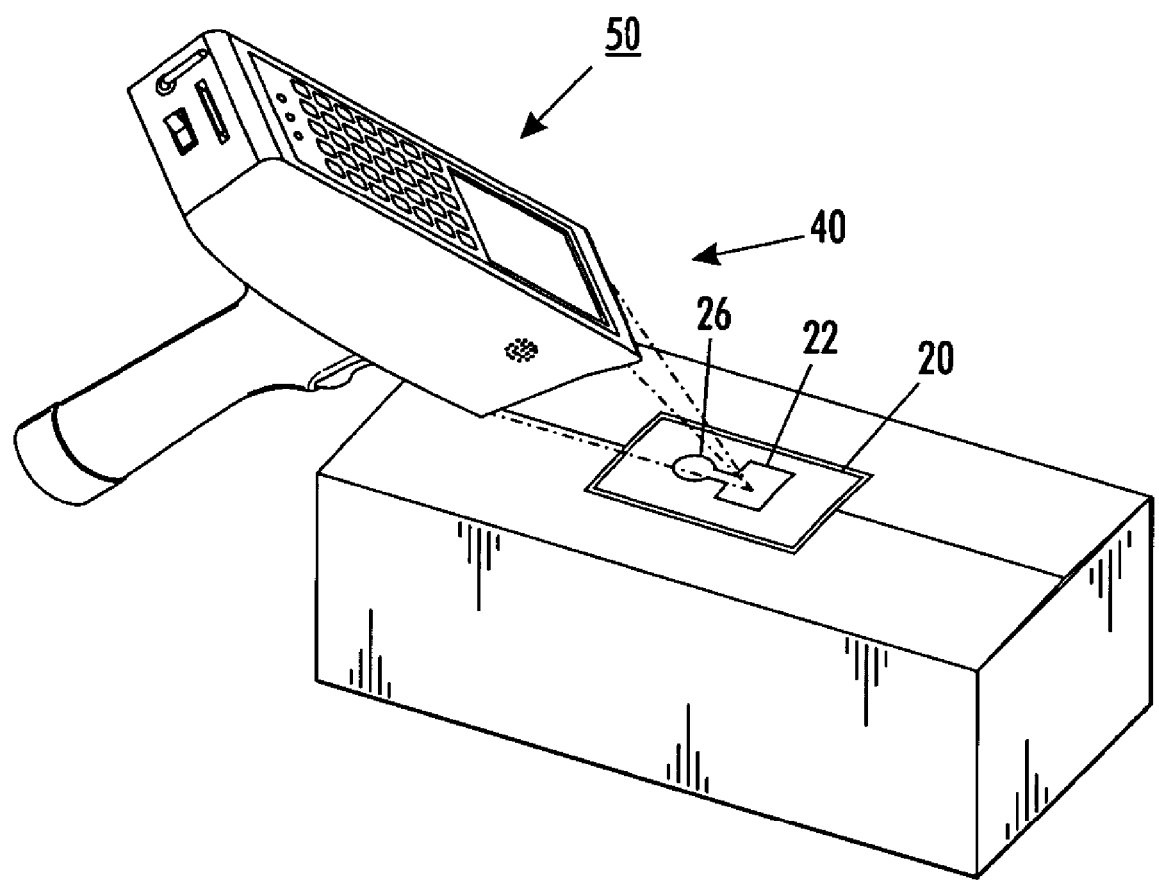
FIG. 6 illustrates a use of a portable tag programmer to program a module tag.
Figure 7:
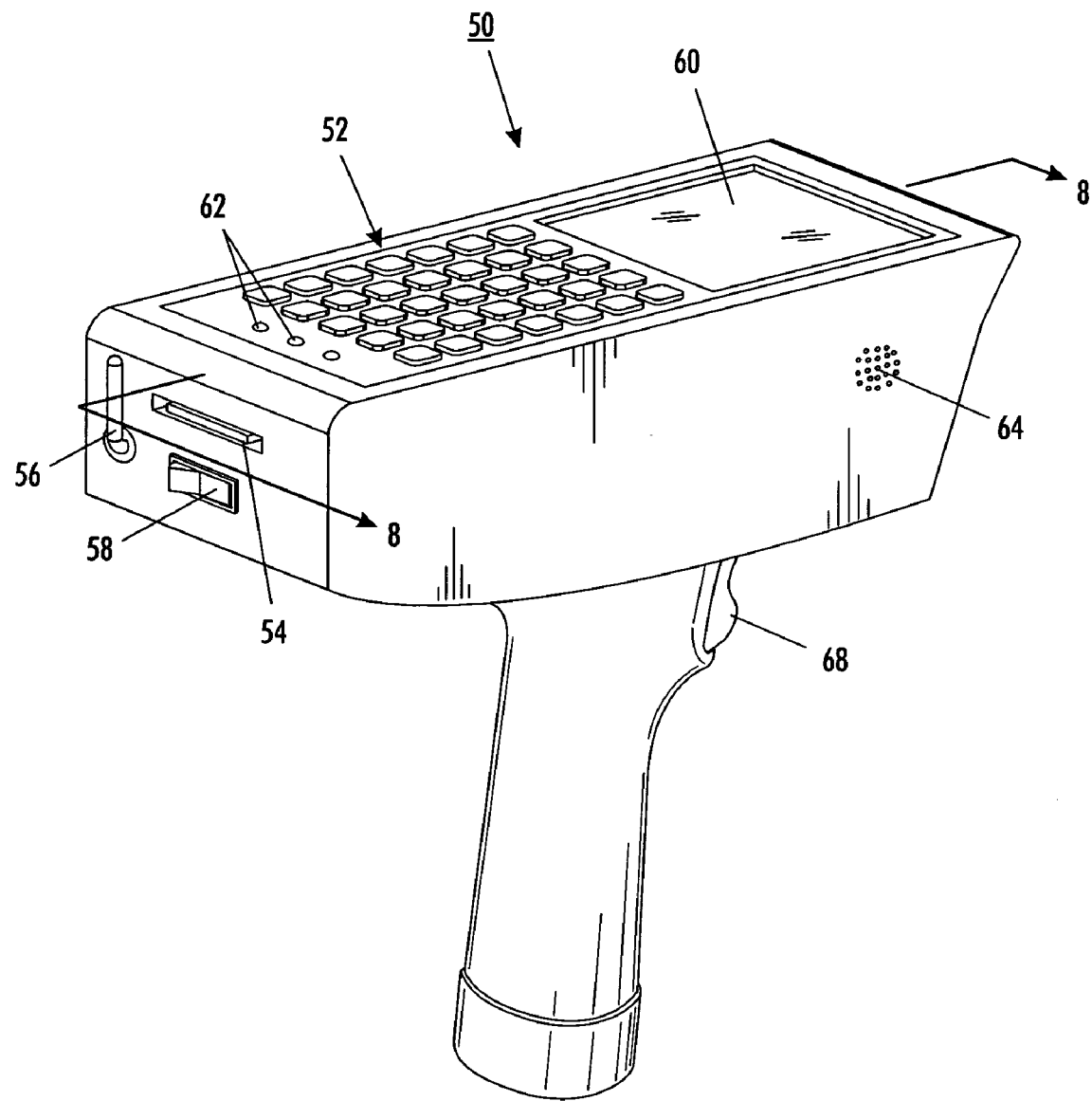
FIG. 7 is a perspective view of one implementation of a portable module tag programmer.

FIG. 6 conceptually illustrates programming the electronic module tag that is associated with a module. Although the drawing shows an arrangement in which the programmable electronic module tag 20 is secured to a container 32 enclosing the module, persons skilled in the art will recognize that the process can also be applied to an electronic module tag attached to the module itself. The process can be applied to a module having an attached module tag whether the module is enclosed within a container or outside of a container.

The tag processing device 50 with the programmer 40 is brought into proximity with the electronic module tag 20. For example, the container 32 enclosing the module 30 (FIG. 3) and bearing the electronic module tag 20 and tag programmer are brought close enough that the communication link is established between the electronic module tag and the tag programmer. The communication link is established through the tag programmer communication element 46 and the module tag communication element 26.

When a communication link is established between the tag programmer and the electronic module tag, the tag reader of the tag programmer 40 can read information from the tag memory 24 of the electronic module tag 20 (FIG. 5). For example, the tag reader may read tag identification information from the tag memory. Such tag identification information may include authentication information that the tag reader can use to verify the genuineness of the electronic module tag. In addition to, or instead of, authentication information, the tag reader may read other identification information that identifies a model number or a configuration status for the module with which the electronic module tag is associated. The user may press a special purpose button on the keypad 52 of the tag processing device to initiate the tag reading process. Or the tag processing device may be configured to periodically emit tag reading instructions whenever the tag processing device is turned on.

The tag processing device emits an identification request. The tag electronics 22 are configured to respond to the identification request by transmitting a tag response that includes the identification information. The nature of the identification request and the tag response depends on details of design, and may include additional security features. The tag response may include data from particular locations in the tag memory 24. Or, for enhanced security, the tag CPU 28 may calculate a tag response based on particular data from the tag memory, and perhaps information contained in the identification request. Persons familiar with data communication and data security will be familiar with various techniques to provide data and data security over a communication link such as the communication link between the electronic module tag and the tag reader segment of the tag programmer. The tag programmer communication element 46 receives the tag response, and directs the tag response signal to the appropriate reader portions of the tag programmer electronics 44.

The tag programmer communication element 46 receives the response from the module tag. This tag response includes the tag identification information from the electronic module tag. The data processor 44 verifies the tag identity by comparing the identification information in the tag response with predetermined identification criteria to determine if the identification information matches that predetermined identification criteria. Persons familiar with data verification will be familiar with various types of identification criteria, and various techniques for determining if the identification information matches the predetermined identification criteria.

If the data processor of the tag programmer verifies the identity of the electronic module tag, the data processor may cause the tag programmer to program the electronic module tag. To program the electronic module tag, the data processor causes the programmer communication element 46 to transmit tag content information toward the electronic module tag. The tag communication element 26 receives the transmitted tag content information. The tag electronics 22 are configured to then store the appropriate tag content in the tag memory 24. The tag content may include module configuration setup information, such as described in U.S. patent application Ser. No. 10/849,974, filed concurrently herewith by Heiko Rommelman et al., now U.S. Publication No. 2005/0258228, and entitled "Control of Programmable Modules," the contents of which are hereby incorporated by reference. Such storage can take place in a variety of ways familiar to persons skilled in the art.

The user supplies the tag processing device with content programming instructions through the user input element of the user interface. For example, the user may press a predetermined series of keys on the keypad 52 to cause the tag programmer of the tag processing device to generate particular tag content information.

The data processor of the tag programmer can be adapted to confirm that the user instruction for a particular tag content is authorized for, or consistent with a particular module. The module can be identified by the identification information on the electronic tag associated with the module. The data processor can compare the identification information received from the electronic tag with predetermined identification criteria for modules authorized to receive the tag content instructions provided by the user. If the tag content instructions indicate a tag content authorized for the identified module, the tag programmer proceeds to program the electronic module tag. If, however, the configuration instructions indicate a tag content that is not authorized for the identified module, the tag processing device provides a signal to the user. Such a signal can be an audible signal on the audio output 64, a visible signal on one or more of the signal lights 62, and/or a message on the graphical user interface 60.

The tag processing device may also be adapted to verify that the user providing tag content programming instructions is authorized to do so, and to submit the particular programming instructions provided. The tag processing device may prompt the user to input user identifying information. The user may provide such user identifying information through the keypad 52, or the tag processing device may include an identification reader device for reading a key card or other device that is associated with the user.

The tag processing device may be part of the programming system provided with functionality like that described in U.S. patent application Ser. No. 10/634,934 by Alberto Rodriguez et al., Control of Programming Electronic Devices, filed Aug. 5, 2003, the contents of which are hereby incorporated by reference. Such functionality may include security features to control access to the programming capabilities of the programming system.

A variety of combinations of the above features may be included for maximum flexibility of use, and for security. For example, certain users can be authorized to provide only certain types of configuration programming instructions, or to provide configuration programming instructions for only certain types of modules (as identified by their tag identification information). A particular user may be authorized to provide only a limited number of configuration programming instructions (i.e., to limit the number of module tags a particular user is entitled to program).

In one implementation, the tag processing device identifies a category into which to classify the module bearing the electronic module tag 20. The data processor 59 analyzes information received at the communication element 46 from the module tag to determine if the information matches one or another of predetermined category criteria. For example, the data processor may contain predetermined category criteria pertaining to a first category, a second category, etc. Such categories may include categories related to the amount that the module has been used (i.e. number of prints produced by a print module), or type of marketing program applicable to the module (sold or leased), or type of service program (all-inclusive, or individual charges), or other criteria. The data processor generates a processor result in accordance with the category match as determined in accordance with the category criteria. The processor results are communicated to another system, such as the computer 95, or to the user through a user interface such as the graphical user interface 60.

Figure 12:
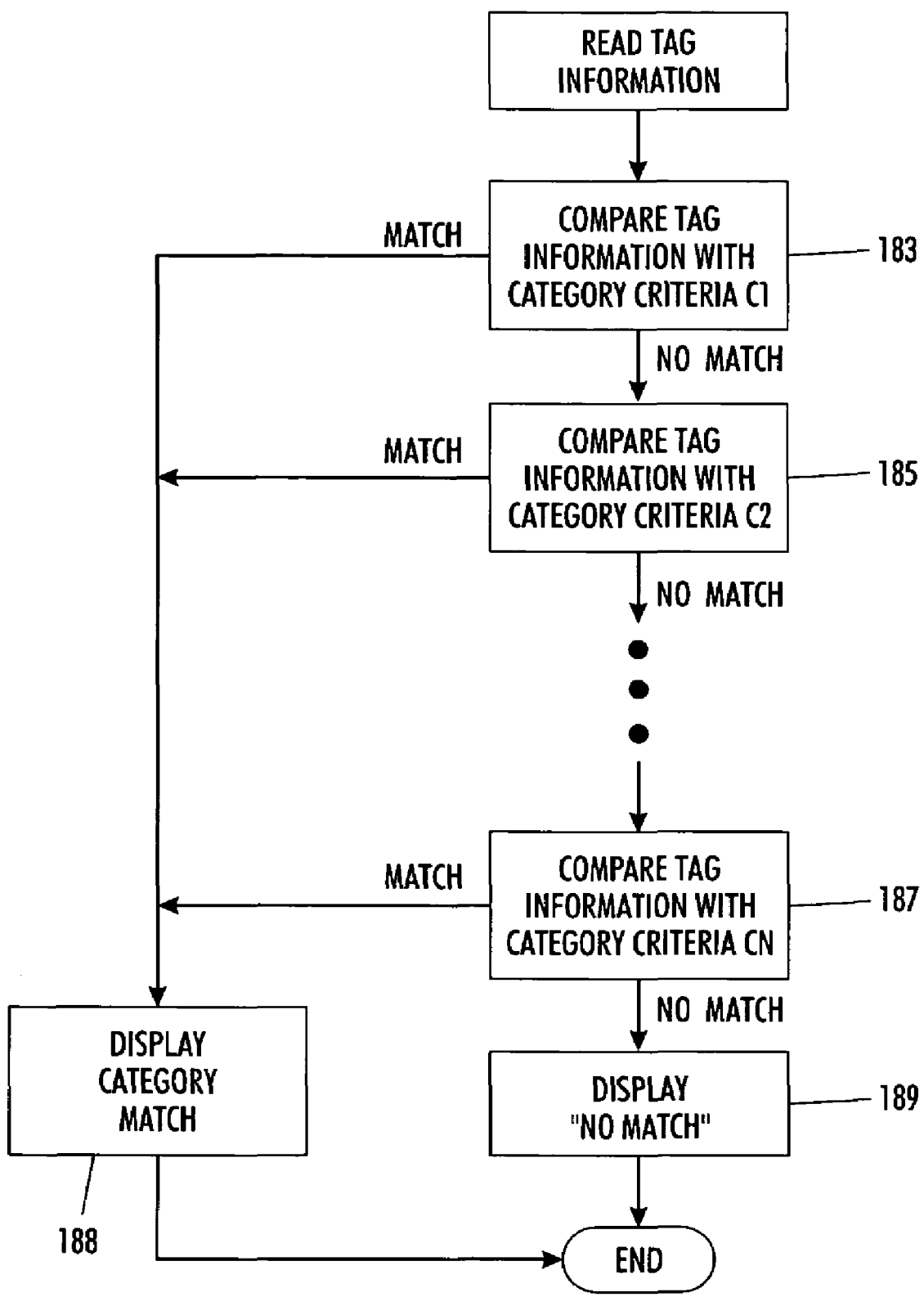
FIG. 12 is a simplified flow chart of a portion of an embodiment of a process incorporating aspects of the present invention.

In an exemplary application, the tag processing device reads tag information from tags attached to expended (used) modules. The tag information may include information about the amount of usage to which the module has been put. By comparing the usage data from the module tag with usage criteria, the data processor can categorize the module into one of a plurality of usage categories, and display that categorization to the user. Referring to the exemplary categorization process shown in FIG. 12, the processor compares received tag information with one category criteria C1 (183) to determine if the module fits a first category. If the tag information does not indicate a match for category criteria C1, the processor compares the tag information with a second category criteria C2 (185) to determine if the module fits a second category. The processor can continue the comparison process for a number of category criteria CN (187). The category match can be displayed 188 to the use on the graphic user interface 60, or, if there are a small number of categories, the category match can be displayed using the lights 62 or even audible signals from the speaker 64. The processor may include the capability to display a "no match" result 189 if the tag information does not match any of the predetermined category criteria. The user can use that categorization to place the module in an appropriate refurbishment or re-manufacturing category. In some implementations, the tag processor may include an on-board printer (not shown) for printing a label with the determined categorization, which label can then be applied to the module.

To illustrate with a particular exemplary application, the module bearing the tag may be a replaceable print module containing toner, a photoreceptor, and other elements for use in a xerographic printer. Included in the tag information maybe the number of images the replaceable print module has made. The tag processing device reads that tag information, and identifies the numbers of images in that information. The processor compares the read number of images against one or more category criteria that include imaging thresholds. For example, if the number of images produced is less than a first threshold, the module maybe placed in a "refill" category. If the number of images is greater than the first threshold, but less than a second (higher) threshold, the module may be placed in a "light re-manufacturing" category. If the number of images is greater than the second threshold, the module may be placed in a "full re-manufacturer" category. Using the categorization information, the user can direct the module to the most appropriate processing facility.

Categorization may include non-exclusive categorization, or categorization based on multiple criteria. For example, if the number of images is less than the first threshold AND the date of manufacture (as indicated by tag information) is prior to a predetermined date, the module may be placed in a particular category, different from the category if the date of manufacture had been subsequent to the predetermined date. After studying the subject disclosure, a person of skill in the art can construct a categorization process consistent with any desired sorting objective.

By providing this categorization capability in a small, portable device, such categorization and proper directing of modules does not need to wait for the module to arrive at a central processing facility. This early categorization reduces transportation of modules, and speeds overall processing.

Other category criteria may include criteria to determine if the module failed in some manner. Such failure mode categorization information can be used to direct the failed module to the appropriate repair facility. In a further example, the data processor 59 includes diagnostic and repair functionality. The data processor may be programmed with instructions to cause the tag diagnostic device to perform diagnostic tests on an electronic module tag. The data processor causes the tag diagnostic device to communicate predetermined information requests to the electronic module tag. The data processor analyses the response (or lack thereof) from the module tag to determine whether the electronic module tag is operating within its proper parameters. The data processor may be adapted to perform sequences of diagnostic tests 100, such as those outlined in FIG. 15.

Figure 13:
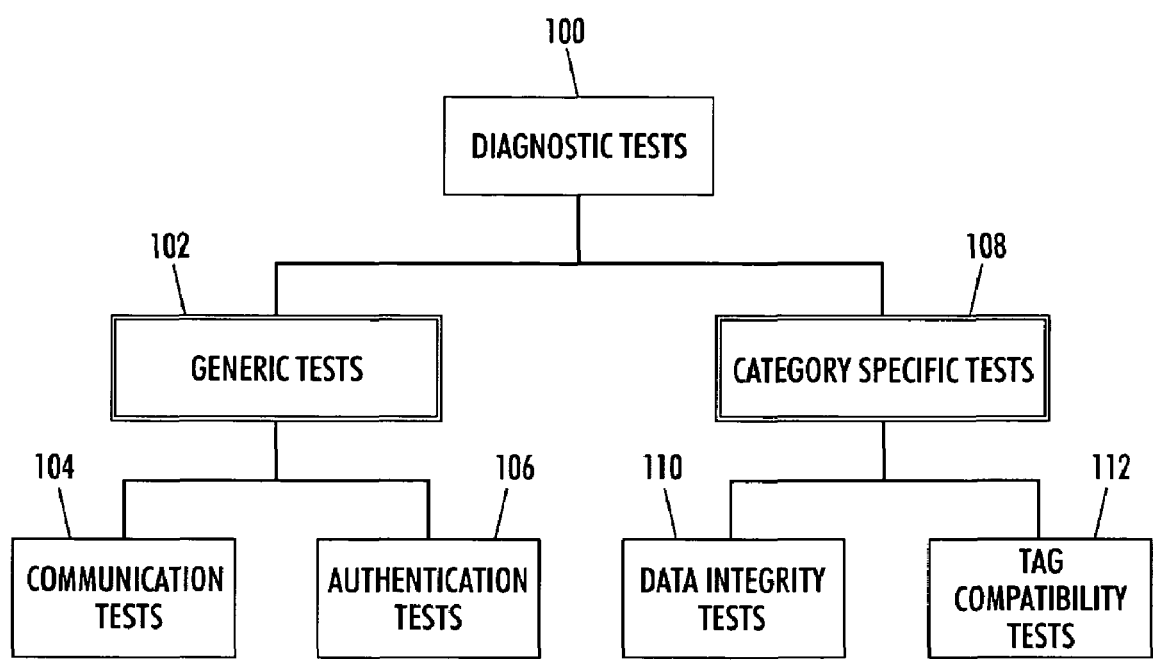
FIG. 13 is a simplified diagram of a structure of an embodiment of a portion of a system incorporating aspects of the present invention.

The data processor 59 of the portable tag processor may also include diagnostic and repair functionality. The diagnostic and repairs functionality may include that described U.S. patent application Ser. No. 10/850,190, filed concurrently herewith by Heiko Rommelmann et al., now U.S. Publication No. 2005/0258963, and entitled "Diagnosis of Programmable Modules," the content of which is hereby incorporated by reference. The data processor may be programmed with instructions to cause the tag diagnostic device to perform diagnostic tests on an electronic module tag. The data processor causes the tag diagnostic device to communicate predetermined information requests to the electronic module tag. The data processor analyses the response (or lack thereof) from the module tag to determine whether the electronic module tag is operating within its proper parameters. The data processor may be adapted to perform sequences of diagnostic tests 100, such as those outlined in FIG. 13.

In an example, one branch of tests may include generic tests 102 that are applicable to electronic tags of many different categories. Such tests include communication sequence tests 104 to confirm that the electronic module tag 20 is communicating correctly through the tag communication element 26. The generic tests may also include authentication tests 106 to confirm the identity and authenticity of the electronic module tag.

Another branch of tests may include tests that are particular to a specific model or category of electronic tag. Such category specific tests 108 may include data integrity tests 110 that confirm that the data read from the electronic tag is of the expected size and type, and tag configuration compatibility tests 112 for confirming that the data read from the electronic tag is consistent with the module or machine with which the electronic module tag is associated.

Figure 14:
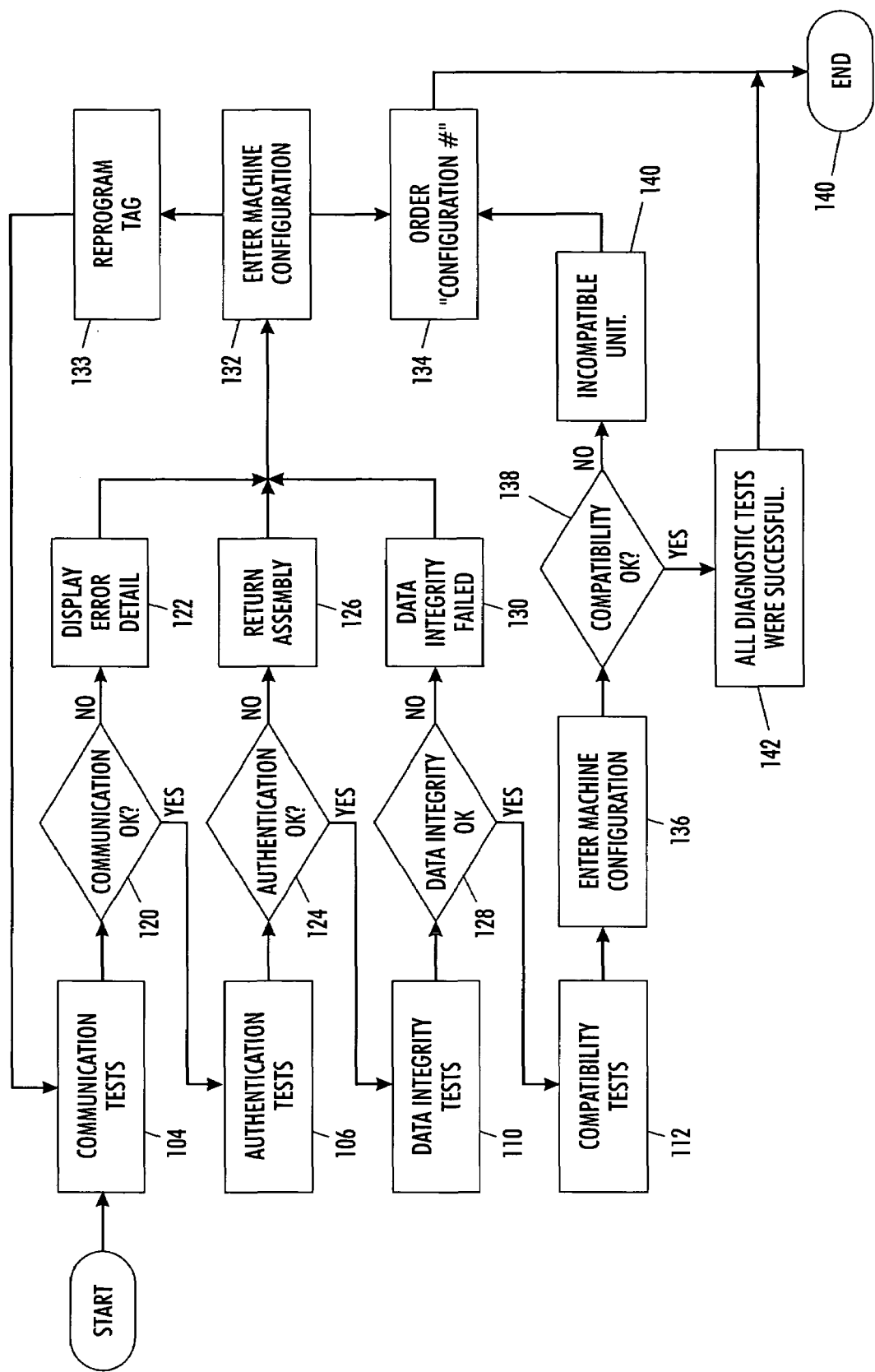
FIG. 14 is a simplified flow chart of a portion of an embodiment of a system incorporating aspects of the present invention.

FIG. 14 illustrates conceptually some of the diagnostic tests that may be performed by the tag processor under the control of the programmed data processor 59. The test categories are shown in a particular order that is logical in many circumstances. However, the tests may be performed in different orders. The different tests determine if the tag is operating within predetermined parameters of acceptable tag performance, using different criteria. From the different criteria, the diagnostic device can identify one or more error categories for a tag malfunction, and to communicate such information to the user of the diagnostic device.

As shown, a first set of diagnostic tests includes communication tests 104 that verify that the electronic tag is properly establishing a communication link with the tag diagnostic device. Failure to properly establish a communication link with the tag diagnostic device indicates a probable failure in the ability of the electronic tag to establish a communication link with a tag programming device or a tag reading device. The communication tests may include tests such as instructions to read particular cells from the tag memory 24, or instruction to write certain data to particular cells in the tag memory, and then read the data from those particular cells to confirm that the data was correctly communicated and stored. Certain electronic module tags have particular predetermined memory cells that cannot be written to or read from without affecting the performance of the tag. The communication tests are configured to bypass such cells and to avoid writing to or reading from such memory cells. Depending on the structure of the individual tag, other communication tests are devised for verifying correct operation of the data bus or other link among the memory, the CPU, and other elements of the electronic tag. The details of the communication tests are determined by the structure of the electronic tag, including its memory element.

The data processor determines from the communication tests 104 whether communication with the module tag is within predetermined parameters. The data processor causes the results of the communication tests to be communicated to the user using various user communication elements of the diagnostic device. For example, a message can be displayed on the graphical user interface 60. If the communication test indicates a failure, the data processor identifies an error category from a predetermined set of error categories, and displays 122 a corresponding error detail (such as "Device Not Responding") on the graphical user interface. The data processor may also activate the signal lights 62 and the audio output 64 to alert the user to the test results. For example, if the communication tests indicate a failure to establish communication, the diagnostic device may cause a red signal light to illuminate, and/or the audio output to emit an audible signal such as a buzzer sound. If the communication tests are successful, a green signal light may be illuminated and/or the audio output may emit a different audible signal, such as a bell sound. In certain implementations, successful test results may not be communicated to the user, and the diagnostic device simply proceeds to the next tests.

The user can initiate the communication tests by pressing a particular key or combination of keys on the keypad 52, or by communicating an instruction from an external device through one of the communication ports 54, 56, in accordance with the programming of the diagnostic device.

Once the communication tests confirm basic communication with the electronic tag, more complicated tests can be performed. In an example, authentication tests 106 can be used to verify that the electronic tag is a genuine (not counterfeit) tag. Authentication tests may include an emulation test to probe the electronic tag with certain types of inquiries to determine if the tag produces the appropriate, expected results. Tests may include memory map validation tests and memory tests to validate certain read only data in the memory element of the electronic tag. Other tests may elicit the tag identification to determine the category of electronic module tag.

One or more communication sequence tests can be used as part of the authentication tests to verify that the electronic module tag is communicating information in the proper sequence. The electronic tag can be designed to produce certain predetermined results upon being presented with certain queries. In an example, in response to certain queries, the electronic tag may read out over the communication element the contents of certain cells in the memory element. In another example, or in response to different queries, the CPU of the electronic tag may perform a predetermined computation on the contents of certain cells in the memory element to produce computed results. The module tag then communicates these computed results over the tag communication element 26. The computation may encrypt the contents of one or more of the memory cells. In yet another embodiment, the computation manipulates the contents of one or more of the memory cells in accordance with a predetermined formula. The predetermined formula may be fixed, or it may vary over time according to another predetermined arrangement. The diagnostic device 46 communication element receives the results transmitted by the tag communication element 26. The data processor 59 of the diagnostic device analyzes the results to determine if the results are consistent with the results expected from an authentic electronic tag 124.

Again, the results of the authentication tests can be communicated to the user using the graphical user interface 60, the signal lights 62, and/or the audio output 64. For example, if the data processor determines that the results received from the electronic tag are inconsistent with an authentic tag, the processor can cause the graphical user interface to display a message 126 indicating that the electronic tag should be returned to the source or to another designated location.

If the results 124 of the authentication tests 106 indicate that a particular module tag being diagnosed is authentic, the tag diagnostic device proceeds with data integrity tests 110. Again, the diagnostic device electronics 44 and the data processor 59 cause the diagnostic device communication element (RF antenna) 46 to emit one or more test inquiries. The tag communication element (RF antenna) 26 receives the test inquiries, and processes them in accordance with the design of the module tag to produce tag results. The tag communicates the tag results from the tag communication element. The data integrity tests may include a data format validation, a data range validation, and a validation of relationships among variables used in the tag electronics.

The data processor compares the received tag results with the expected tag results 128. If the module fails the data integrity tests 110, the data processor can cause the user interface to display failure indications. For example, the graphical user interface 60 may display a message 130 that the data integrity tests failed. The message may include instructions to return the assembly of the module tag and associated module to a source, such as the manufacturer or a distributor. Other failure indications may include illumination of a particular one of the signal lights 62 and/or a particular type of audio signal from the audio output 64.

The machine user may need to replace a module associated with a tag that fails any one of the communication tests 104, the tag authentication tests 106, or the data integrity tests 108. To do so, the user of the diagnostic device enters information 132 about the machine with which the module is to be used (machine configuration information) for submission to the appropriate ordering or purchasing systems. Using the machine configuration information, the diagnostic system or an external ordering system identifies the module configuration appropriate for that machine configuration 134.

In certain circumstances, the nature of the tag failure may indicate that the tag can be reprogrammed for proper use. Such circumstances may particularly occur when the communication tests and the authentication tests are successful, but certain of the data integrity tests fail. The data processor, upon analyzing the nature of the failure, may determine that the failure coincides with a category of failure that can be rectified by reprogramming the tag.

If the data processor determines that the failure can be rectified by reprogramming the tag, a reprogramming process 133 is invoked. Using information such as the machine configuration and other information either read from the tag, or entered by the user, the data processor 59 of the diagnostic tool activates the diagnostic device communication element (RF antenna) 46 to transmit reprogramming information. The tag communication element (RF antenna) 26 receives the programming information and stores the correct tag data in the tag memory 24. The reprogramming process can be automatic, or it may interact with the user by displaying instructions or queries on the graphical user interface 60 and awaiting user input from the keypad 52 or other user input mechanism. One particular interactive process may include authentication of the user's repogramming authority. The diagnostic device may display a request for the user's identity. The user may supply the requested information through a series of entries using the keypad 52 or through an identity card reader attached to the diagnostic device. The data processor can determine from the supplied identity information whether the user has authority to initiate the reprogramming of the tag. Once the tag has been reprogrammed, the reprogrammed tag can be subjected to the diagnostic tests to confirm successful reprogramming. In certain circumstances, the retesting may bypass the communication tests 104 and the authentication tests 106, and proceed directly to the data integrity tests 110.

If the data integrity tests 110 determine 128 that the data integrity is acceptable, a set of compatibility tests 112 are invoked to verify that the electronic module tag matches the environment in which the module tag is being used. The modules with which the module tag is associated are designed for use in particular environments, such as particular machines and particular geographic regions for optimum performance. This information is stored on the module tag.

The compatibility tests 112 may include a geographic validation test to confirm that the module to which the module tag is associated is being used in the geographic region for which the module was designed and manufactured. The compatibility tests may also include machine product family and machine product type validation tests. The operator of the diagnostic device enters information about the configuration of the machine in which the module is being used or to be used 136. The operator enters this information using the keypad 52, or using another device such as a portable computer that communicates with the diagnostic device through one of the communication ports 54, 56. The machine product family and machine product type validation tests verify compatibility between the machine and the module to which the module tag is associated. In an embodiment, the machine product family and machine product type validation tests are combined into a single machine model validation test that validates the particular machine model number against a list of proper machine models for the module identified by the information read by the tag diagnostic device reading the module tag.

The compatibility tests may also include a service plan validation test. Machines in which the module to which the module tag is associated may operate under different service plans that call for different types of modules. For example, if machine is a printer and the module is a replaceable module, such as a toner cartridge, different types of toner cartridges may be used for different service plans. One type of module may be appropriate for a machine for which the user purchases replaceable modules, while a different type of module is appropriate for a machine for which the user pays a set per print charge, and does not purchase individual replaceable modules. The service plan validation test verifies the correctness of the tag for the machine's service plan to ensure that the tag is of the type to record and communicate to the user the appropriate type of information that will allow the user to properly manage usage of the machine under that user's machine service plan. When the user of the diagnostic device enters machine configuration information into the diagnostic device, the configuration information includes information about the machine service plan.

The data processor examines the results of the compatibility tests 112 to determine 138 if the module tag is compatible with the geographic region, the machine, and the machine service plan. Because the tag is associated with a particular replaceable module for the machine, the compatibility tests for the module tag also reveal to at least some degree whether the module is compatible with the machine.

If the compatibility tests reveal that the module tag is compatible with all of the geographic region, the machine, and the machine service plan, the diagnostic device proceeds to the end of the diagnostic routine. The diagnostic device may display indications to the user that all diagnostic tests were successful 142.

If the compatibility tests reveal that the module tag is incompatible with any of the geographic region, the machine, or the machine service plan, the diagnostic device displays a failure indication. In an example, the user interface can display a text message such as, "incompatible unit" 140, and may also provide text or graphical information about the nature of the incompatibility. In addition, or in alternatives, a signal may be exhibited visually by at least one of the signal lights 62, and audibly by the audio output 64. From the nature of the incompatibility, the diagnostic device or other system may identify the correct module to order, and generate the correct module order configuration 134.

In an embodiment, rather than reading data from the module tag for each test, the diagnostic device reads once all the contents of the tag memory, and stores the tag data in memory on board the diagnostic device. The data processor is then able to perform authentication tests 106, data integrity tests 110, and tag compatibility tests 112 on the tag data without having to retransmit data from the module tag. Reading all the data at once also eliminates communication of selective data, which communication could, if intercepted, reveal proprietary information concerning the data structure of information stored in the tag memory.

Figure 15:
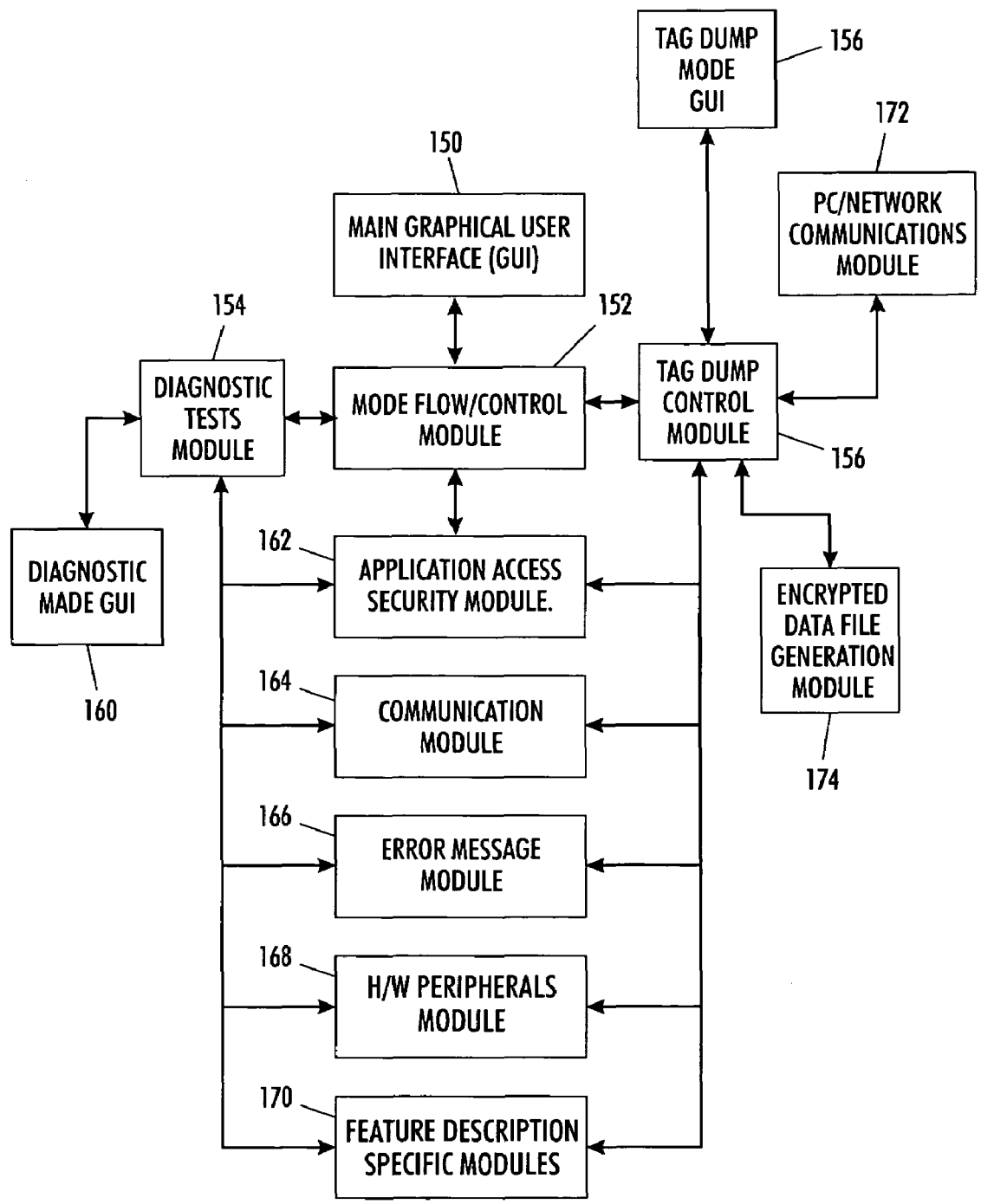
FIG. 15 is a simplified diagram of a structure of an embodiment of a portion of a system incorporating aspects of the present invention.

FIG. 15 illustrates an exemplary organization of the software contained in the diagnostic device. The software is organized modularly. The modular organization of the diagnostic software provides ease of support and maintenance. New tests specific to particular module tags can be added to the diagnostic software without disrupting other portions of the software.

The main graphical user interface (GUI) module 150 contains code that controls the user's access to the capabilities of the diagnostic device. The main graphical user interface module may control a password control interface on the graphical user interface 60. This module may also control the user's navigation through the different tests.

The mode flow/control module 152 controls the interaction of other modules, including the diagnostic tests module 154 and the tag dump control module 156. The tag dump control module governs the reading of the entire contents of the module tag memory so that the diagnostic device can analyze the data. A separate tag dump mode graphical user interface module 158 may provide information to the user vice the graphical user interface 60. A diagnostic mode graphical user interface (GUI) module 160 controls instructions and information provided to the user during the diagnostic tests. The diagnostic mode GUI module causes the different error messages to display in different colors on the graphical user interface for added user attention. An application access security module allows access to and use of the diagnostic tests of the diagnostic device to be limited. The application access security module performs password validation and provides a mechanism for changing passwords.

A communication module 164 handles low level (basic) communications between the diagnostic device and the module tag. An error message module 166 contains a list of all the error categories and their associated error codes and messages to be displayed on the graphical user interface 60. A hardware (H/W) peripherals module 168 contains code for handling interaction with peripheral hardware such as an accessory bar code scanner (not shown). One or more feature description specific modules 170 contain information relating to individual specific models of tags, specific tag features, and particular variables, definitions, interpretation of data, etc.

A PC/Network communications module 172 contains the code necessary to communicate information via one of the diagnostic device communication ports 54, 56 to a data network computer, or other external device.

An encrypted data file generation module 174 contains code to encrypt the data retrieved from the tag by the tag dump control module. Encrypting the tag data protects the information from unauthorized access.

These software modules may be stored in a memory device such as a hard drive (not shown) inside the diagnostic device. The software modules may also be embedded in firmware formed as part of the diagnostic device electronics 44 (FIG. 11).

Information can be added to the tag memory at different times. Thus, certain information, such as the physical configuration of the module enclosed within the container, may be stored in the tag memory at one time, such as upon placing the module in the container. Additional information, such as the marketing part number, may be added at a later time. Yet additional information, such as tracking information indicating a particular distributor warehouse, the particular service technician who installs the module, or other information can be added at later times. Thus, tracking information can be stored in the tag memory attached to the container, so that the container itself retains a history of where it has been, and what steps have performed upon it. In this way, a subsequent tag reader can access this information and identify the history of the container enclosing the module, without requiring that the tag reader access a central tracking system.

While the invention has been described in the context of particular implementations, those skilled in the art, after studying the present disclosure, will recognize the various modifications can be made without departing from the spirit of the invention. Such modifications may include different configurations for the electronic module tag, different types of tag programmers and readers, and different placement of the electronic tag on the module, or on a container for enclosing the module. In addition, the module enclosed within the container can be a module other than a toner cartridge, and may include any type of replaceable module for a printing apparatus. Furthermore, the electronic tag can be used for modules other than replaceable modules for printing apparatus. Therefore, the scope of the invention is not to be limited to the specific implementations described above.

We claim:

1. A portable processing device for processing an electronic tag associated with a module, the processing device comprising:
    a hand-held data receiver comprising a communication element for receiving data from an electronic tag associated with a module;
    a processor for analyzing data received at the communication element in accordance with programmed instructions to produce a processor result, wherein the processor result is based on the received data;
    a transmitter for transmitting the processor result; and
    a user input element,
    wherein the transmitter transmits the processor result in such a manner that at least a portion of the processor results can cause information to be stored in a memory segment of the electronic tag;
    wherein the communication element is adapted to receive authentication data from the electronic tag;
    wherein the processor is adapted to analyze the received authentication data to determine if the received authentication data matches predetermined authentication criteria to produce a 'tag authenticated' signal if the received authentication data matches the authentication criteria;
    wherein the processor is further adapted to generate a processor result comprising tag programming information only if the processor produces the 'tag authenticated' signal; and
    wherein the processor is adapted to generate a first processor result if both the user input element receives a first instruction and the processor produces the 'tag authenticated' signal;
    wherein the processor is adapted to generate a second processor result if both the user input element receives a second instruction and the processor produces the 'tag authenticated' signal;
    wherein the transmitter is adapted to transmit first tag programming information if the processor produces the first processor result; and
    wherein the transmitter is adapted to transmit second tag programming information if the processor produces the second processor result.

2. A portable processing device for processing an electronic tag associated with a module, the processing device comprising:
    a hand-held data receiver comprising a communication element for receiving data from an electronic tag associated with a module;
    a processor for analyzing data received at the communication element in accordance with programmed instructions to produce a processor result, wherein the processor result is based on the received data; and a transmitter for transmitting the processor result;

wherein the transmitter transmits the processor result in such a manner that at least a portion of the processor results can cause information to be stored in a memory segment of the electronic tag;

wherein the communication element is adapted to receive authentication data from the electronic tag;

wherein the processor is adapted to analyze the received authentication data to determine if the received authentication data matches first predetermined authentication criteria, or if the received authentication data matches second predetermined authentication criteria;

wherein the portable processing device additionally comprises a user input element for receiving user instructions;

wherein the processor is adapted to generate a first processor result if the received authentication data matches first predetermined authentication criteria and the user input element receives a first user instruction;

wherein the processor is adapted to generate a second processor result if the received authentication data matches second predetermined authentication criteria and the user input element receives the first user instruction;

wherein the transmitter is adapted to transmit first tag programming information if the processor produces the first processor result;

wherein the transmitter is adapted to transmit second tag programming information if the processor produces the second processor result;

wherein the processor is adapted to analyze the data received at the communication element to determine if the received data matches first predetermined category criteria or if the received data matches second predetermined category criteria;

wherein the processor is adapted to generate a first processor result if the received data matches the first predetermined category criteria; and wherein the processor is adapted to generate a second processor result if the received data matches second predetermined category criteria.

3. A method of processing an electronic tag associated with a module, the method comprising:

bringing a portable electronic reader device into proximity with an electronic tag associated with a module;

causing the portable electronic reader device to read tag data from the electronic tag;

electronically processing the tag data in the portable electronic reader device in accordance with programmed instructions stored in the portable electronic reader device to produce a processor result, wherein the processor result is based on the tag data; and transmitting the processor result outside the portable electronic reader device;

wherein electronically processing the tag data comprises determining whether the tag data matches predetermined tag criteria;

wherein the method additionally comprises receiving either a first user programming instruction or a second user instruction;

wherein if the user input element receives the first user programming instruction and the tag data matches predetermined tag criteria, transmitting the processor result comprises programming the memory segment of the tag with first module operating information; and wherein if the user input element receives the second user programming instruction and the tag data matches predetermined tag criteria, transmitting the processor result comprises programming the memory segment of the tag with the second module operating information.

4. The method of claim 3, wherein:

causing the portable electronic reader device to read tag data from the electronic tag comprises transmitting an identification request to the electronic tag;

causing the electronic tag to perform a tag identification calculation to generate the tag identification data reading the tag identification information; and electronically processing the tag data comprises verifying that the tag identification information matches predetermined identification criteria.

5. The method of claim 3, wherein:

causing the portable electronic reader device to read tag data from the electronic tag comprises causing the portable electronic reader device to read tag diagnostic data pertaining to operation of the electronic tag;

electronically processing the tag data comprises analyzing the tag diagnostic data to generate diagnosis information; and transmitting the processor result comprises transmitting the diagnosis information.

6. The method of claim 5, wherein transmitting the diagnosis information comprises displaying the diagnosis information on a graphical user interface of the portable electronic reader device.

* * * * *